United States Patent [19]

Sorenson

[11] 4,250,777
[45] Feb. 17, 1981

[54] BORING HEAD

[76] Inventor: Walter E. Sorenson, 3870 Ugstad Rd., Duluth, Minn. 55811

[21] Appl. No.: 524

[22] Filed: Jan. 2, 1979

[51] Int. Cl.³ .................... B23B 3/00; B23B 41/00; B23B 51/00
[52] U.S. Cl. .................................. 82/2 E; 82/1.2; 408/147
[58] Field of Search ............... 82/1.2, 2 E; 408/147, 408/152

[56] References Cited

U.S. PATENT DOCUMENTS

| | | | |
|---|---|---|---|
| 2,196,231 | 4/1940 | Ridgway | 82/2 E |
| 2,831,386 | 4/1958 | Woytych | 82/2 E |
| 2,901,935 | 9/1959 | Keller, Jr. et al. | 82/2 E |
| 3,286,556 | 11/1966 | Reynolds | 82/1.2 |
| 3,371,559 | 3/1968 | Scholl | 82/2 E |
| 3,422,705 | 1/1969 | Nahodil et al. | 82/1.2 |
| 3,599,517 | 8/1971 | Muller | 82/2 E |
| 3,937,586 | 2/1976 | Watson | 408/147 |
| 4,067,251 | 1/1978 | Eckle et al. | 82/1.2 |

Primary Examiner—Harrison L. Hinson
Attorney, Agent, or Firm—Kinney, Lange, Braddock, Westman, and Fairbairn

[57] ABSTRACT

A boring head for use in machining the inner surface of a vertical work piece wall having inner and outer surfaces and a central opening therethrough to produce a flat, plane, discoid surface where a boring machine and a boring bar to which the boring head is to be attached are situated adjacent the outer surface of the vertical work piece wall. The boring bar and work piece are positioned to have the boring bar axis of rotation coincident with the axis of the desired final machined discoid surface. A taper shank extending outwardly from a main body of the boring bar projects through the work piece wall opening to fasten to the boring bar to position the boring head in adjacent relation to the inner surface of the work piece wall. A tool slide extends longitudinally outwardly from the main body radially of the axis of rotation of the boring bar. A tool holder is slidably mounted in the tool slide, and a tool bit in the tool holder extends outwardly through a slot in the tool slide in direction toward the inner surface of the work piece wall. The tool bit is guided for precise longitudinally movement with respect to the tool slide by tool slide flats which define the slot. A threaded feed screw is rotatably mounted in the body of the boring head and means is provided to move the tool holder longitudinally of the tool slide responsive to rotation of a feed screw nut threadably associated with the feed screw. Relative motion of this nut with respect to the feed screw is obtained by use of a driver rotatably mounted with respect to the boring bar rotation axis and by gearing means connected between this driver and the feed screw nut. A static drive bar is connected to this concentric gear driver to prevent rotation of the driver relative to the work piece thus forcing rotation of the driver relative to the rotating boring head.

11 Claims, 7 Drawing Figures

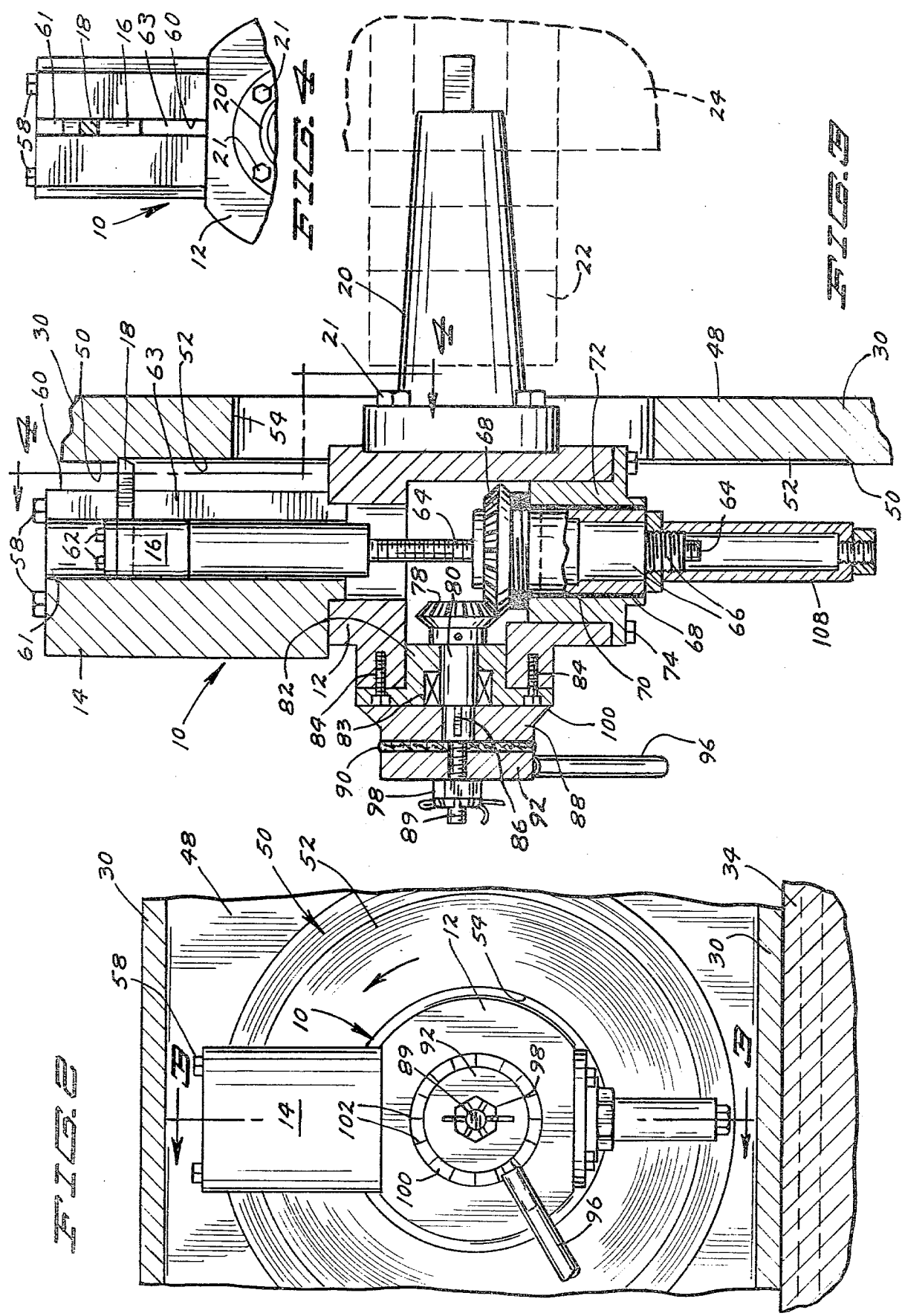

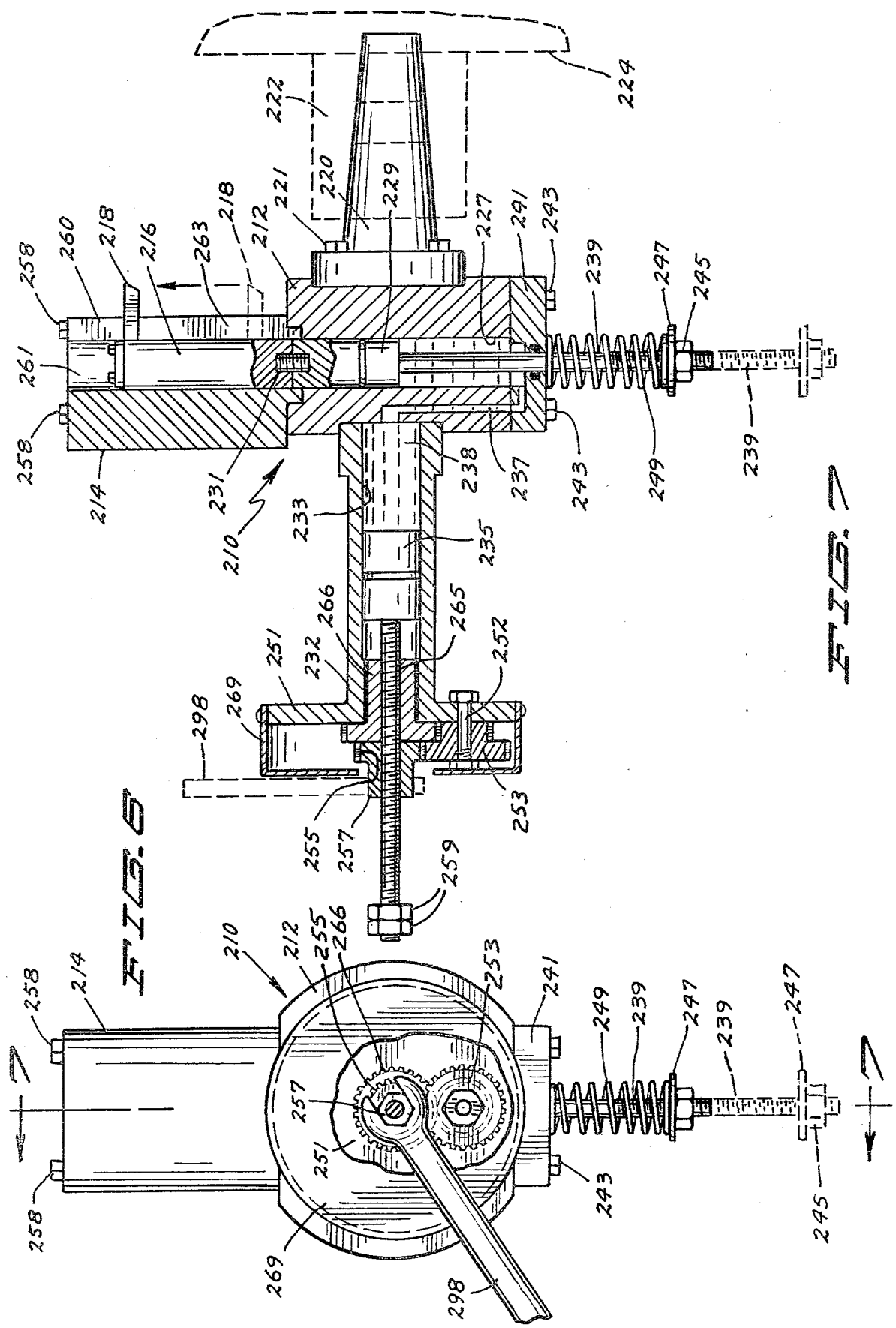

BORING HEAD

BACKGROUND OF THE INVENTION

This invention has relation to the use of a boring machine having a boring bar rotating on a horizontal axis to machine vertical, plane, discoid faces on work pieces where the center of the discoid face to be machined lies at the center of the axis of the boring bar rotation. The invention is particularly related to the problem of machining such a discoid face in a surface of a work piece which cannot be brought into face-to-face relationship with the boring machine and the boring bar extending outwardly therefrom.

In order to accomplish such back facing before the present invention, it was common to fasten an essentially J-shape attachment onto the boring bar, extending the vertical shank of the "J" through an opening in the work piece concentric with the discoid surface to be machined, with a tool bit positioned at the outside hook end of the "J". A slide extending radially outwardly from the axis of rotation of the boring bar was situated between the J-shape attachment and the boring bar. An attachment holder was positioned on the slide and was connected by appropriate gearing to a star wheel at the outer end of the slide. The parts were arranged in such a manner that the star wheel collided with an obstruction on every rotation of the boring bar; and with every such collision, the star wheel turned through an angle to move the attachment holder along the slide to cause the tool bit to be suddenly moved radially outwardly with respect to the boring bar axis.

This structure had a number of disadvantages. First, there was a springiness to the action of the tool bit in making its cut because it was at the end of a J-shape attachment, fastened to an attachment holder which was mounted in a slide which was mounted to the boring bar. Second, the method of feeding the tool bit forward was unsatisfactory because the tool bit moved forward once each revolution of the slide, the movement coming with a jerk each time the star wheels hit the obstruction. The net result was the production of a machined surface having substantially less than the accuracy desired.

Further, the size of the hole or opening in the work piece determined the radial dimension of the facing cut which could be made before the relationship of a J-shape attachment and the attachment holder on the slide had to be changed. As a result, the original set-up time and the changes in set up during the facing operation were considerable.

A patent which discloses a boring machine tool which has hydraulic apparatus for laterally displacing a rotating tool bit is U.S. Pat. No. 3,937,586 to Watson, granted in February of 1976. It does not disclose any means of performing a back facing operation.

A facing head in which a slide supporting a tool holder and a tool bit is shiftable radially at the front of a supporting body in order that face machining takes place at a work piece is disclosed in U.S. Pat. No. 4,067,252, granted to Eckle et al in January of 1978. Adjustment of the slide is obtained through movement of an adjusting rod located concentric with the axis of the spindle of the boring bar. Such a structure could not be adapted to do reverse facing, and no disclosure relative thereto is present in this patent.

U.S. Pat. No. 3,286,556 to Reynolds et al, granted in November of 1966 discloses a boring head with means for radially adjusting or moving a cutting tool on the head while the boring spindle is rotating. This structure could not possibly be adapted to back facing, and no such reference is made in this patent.

U.S. Pat. No. 3,422,705 to Nahodil et al, granted in January of 1969, also shows a boring head having means to drive a tool radially of the head. Like the aforementioned prior art patents, the support for the machine tool is such that the structure cannot be adapted for back facing. The Nahodil et al structure is useful as a recessing tool.

U.S. Pat. No. 3,599,517 granted to Muller in August of 1971 shows a boring head having a means to drive a tool radially of the head. Because of the structure of the boring head, it cannot be adapted to perform a back facing operation either.

A preliminary search was made on the structure of this invention, and the patents cited above were the closest patents located on this search.

The inventor and those in privity with him know of no prior art structures closer than those described in this application; and they acknowledge their responsibility to bring any more pertinent prior art to the attention of the Examiner should such prior art subsequently become known to them.

The structure of the present invention was designed to make possible efficient and accurate back facing of surfaces lying in a plane normal to the axis of a boring bar, and to overcome the inherent difficulties present in the prior art means of accomplishing this result.

BRIEF SUMMARY OF THE INVENTION

A work piece to be machined is fixedly positioned relative to the axis of boring bar rotation of a boring machine or similar machine tool so that this axis of rotation is concentric with the center of the facing cut to be made. A boring head made according to the invention has a main body with a shank extending therefrom. The boring head is positioned at the side of the work piece to be machined with the shank extending through the work piece opening and being attached to the boring bar to establish an axis of boring head rotation coincidence with the axis of the boring bar rotation.

A tool slide extends longitudinally outwardly from a main body of the boring head radially of the axis of boring head rotation. A tool holder is slidably mounted in the tool slide for movement radially of the axis of boring head rotation. A tool bit is fastened in the tool holder to extend outwardly from the tool slide through a slot provided in the tool slide. The sides of the tool guide slot are defined by parallel, spaced, tool bit guide flats. The tool bit is supported and guided by these flats.

Hydraulic or mechanical means is provided to move the tool holder and the tool bit longitudinally of the tool slide evenly and at a rate proportional to the rate of movement of the boring head around its axis of rotation. This means includes a driver rotatably mounted at an end of the boring head body in concentric relationship to the axis of boring head and boring bar rotation and at an end thereof opposite the boring bar. Means is provided to restrain the driver from movement with respect to the work piece while the boring head is rotating, and gear means (combined in one form of the invention with hydraulic means) is provided to combine with screw means to move the tool holder longitudinally of the tool slide upon rotation of the boring head with respect to the driver.

IN THE DRAWINGS

FIG. 1 is an elevational view of a boring head made according to a first form of the invention showing its relationship to a boring machine and boring bar on which it is installed and to a work piece on which it is facing a surface, the work piece being shown in vertical section;

FIG. 3 is an enlarged vertical sectional view taken on the line 3—3 in FIG. 2;

FIG. 4 is a fragmentary elevational view at reduced scale taken on the line 4—4 in FIG. 3;

FIG. 6 is an end elevational view of a boring head made according to a second form of the invention; and FIG. 7 is a vertical sectional view taken on the line 7—7 in FIG. 6.

DESCRIPTION OF PREFERRED EMBODIMENTS

FIRST FORM

Figure 2:
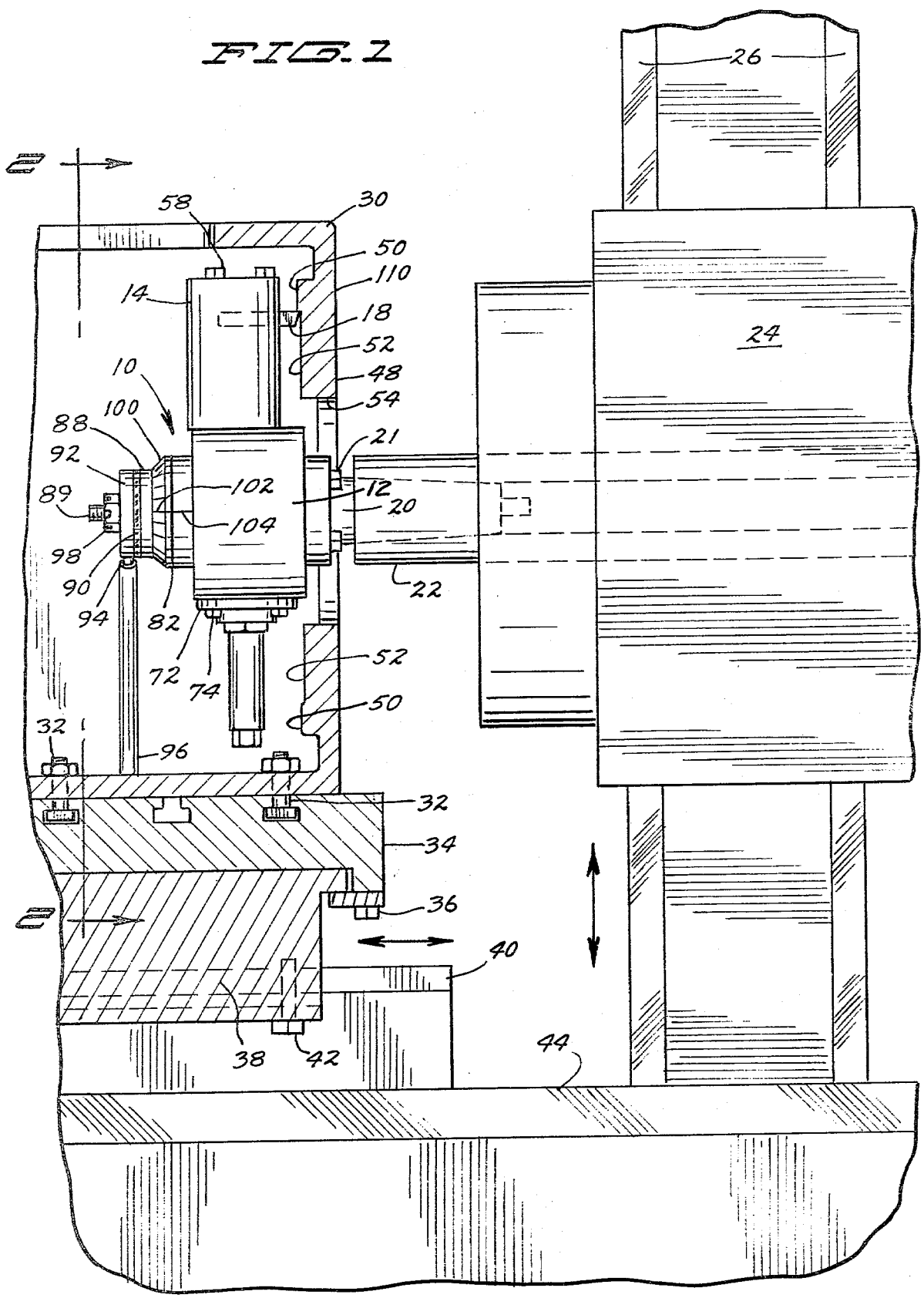
FIG. 2 is an end elevational view of the boring bar of FIG. 1 taken on the line 2—2 in that figure.
Figure 5:
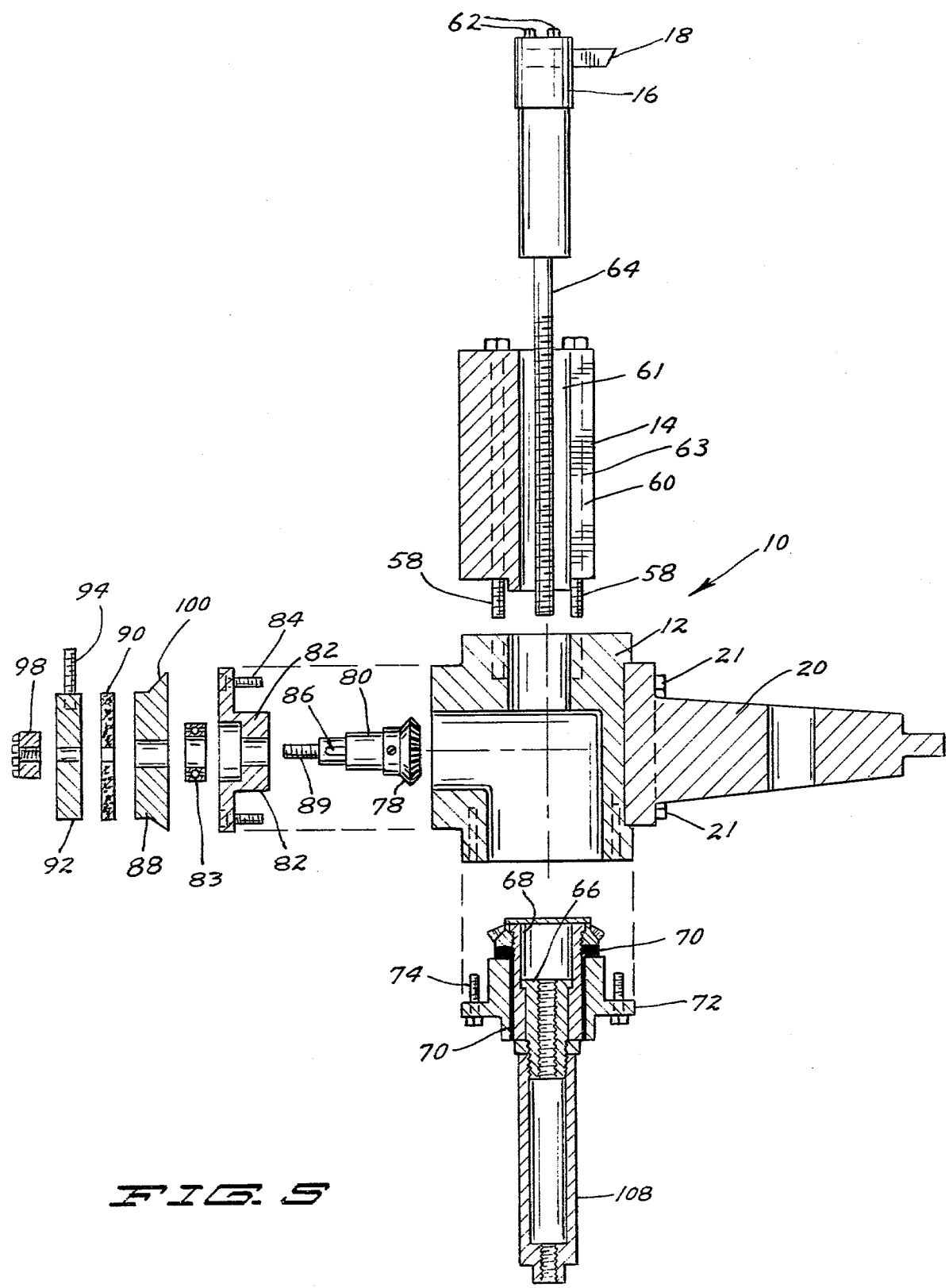
FIG. 5 is an exploded view of the boring head of the first form of the invention with the parts positioned relatively to the parts as seen in FIG. 3.

A boring head 10 of a first, mechanically fed, form of the invention includes a main body 12, a tool slide 14 bolted to the main body, a tool holder 16 slidably mounted in the tool slide, a tool bit 18 mounted in the tool holder, and a taper shank 20 bolted as at 21 to the main body. As seen in FIG. 1, this taper shank 20 can be attached in any usual or preferred manner to a boring bar 22 which is rotatably driven in a boring machine 24. The boring machine is illustrated somewhat schematically as being vertically movable on vertical ways 26.

A work piece 30 is shown in FIG. 1 as being temporarily bolted as at 32 to a work table 34 which is adjustably mounted for horizontal movement transverse to the axis of the boring bar on a work platform 38, and can be fixedly clamped to the platform 38 as at 36. The work platform 38 is movable with respect to horizontal ways 40 in horizontal direction parallel with the axis of the boring bar 22, and can be clamped fixedly with respect to ways 40 as indicated at 42. Horizontal ways 40 and vertical ways 26 are rigidly and fixedly mounted with respect to each other on a floor 44.

As clearly seen in FIGS. 1 and 3, work piece 30 includes a vertical wall 48 which is provided with a substantially vertical surface 50 on a side of the wall 48 opposite the boring machine 24, which surface 50 is being and is to be faced with the use of a boring head of the invention to provide a precisely vertical machined wall face 52.

As best seen in FIG. 1, the vertical wall 48 of the work piece 30 is provided with a circular opening 54 in substantially concentric relationship to the desired final machined vertical wall face 52 thereof to permit access of the taper shank 20 of the boring head of the invention to the boring bar 22. One means of positioning the boring bar 10 for use is to fasten the boring machine 24 and the work piece 30 fixedly with respect to each other to have the central axis of the boring bar 22 coincident with the center of the vertical opening 54 in the vertical work piece wall 48. The boring head will then be installed with its taper shank 20 in the boring bar 22, and with its tool bit 18 in facing relation to the vertical surface 50 of the work piece wall 48, but with the parts positioned so that the tool bit is positioned radially inwardly from the outer edge of the circular opening 54.

In order to positively guide the tool bit 18 as it moves outwardly across the work face 50, the tool slide 14 is bolted to the main body 12 of the boring head by four cap screws 58 in such a manner that parallel, spaced-apart, tool bit guide flats 60,60, defining a slot 63 in the tool slide 14, are in adjacent relationship to the work piece surface 50 to be machined.

Also provided in the tool slide 14 is a cylindrical tool holder receiving surface 61 which snugly receives a peripheral cylindrical surface of the outer end of the tool holder 16. The tool bit 18 is clamped in the end of the tool holder 16 in any usual or preferred manner, as by set screws 62 for example. An intermediate and inner cylindrical end portion of the tool holder 16 is relieved slightly so that it will not normally come into contact with the tool holder receiving surface of the tool slide 14. Permanently mounted on the inner end of this tool holder 16 is a lead screw 64 which extends back through the body 12 of the boring head. A lead screw nut 66 and a bevelled drive gear 68 are permanently bonded to each other and are rotatably mounted in a bronze bushing or bearing 70 in a drive gear bearing carrier 72. The bearing carrier is bolted to the body 12 to become a part of it through the instrumentality of cap screws 74. Thus the lead screw nut 66 and drive gear 68 is rotatably mounted with respect to the main body 12 of the boring head 10. The nut 66 is internally threaded to receive lead screw 64. The lead screw, being integral with tool holder 16 is prevented from rotation with respect to the body 12 by the presence of tool bit 18 sliding longitudinally between the tool bit guide flats 60,60 of the tool slide 14 which is integrally bolted to the body 12.

In order to machine surface 50 of work piece 30, boring bar 22 is rotated to rotate the boring head 10 on the axis of the boring bar through the instrumentality of boring head taper shank 20. To move tool bit radially of the surface to be machined, lead screw nut 66 and lead screw drive gear 68 must be rotated in the body 12 relative to the non-rotatable lead screw 64 thus to force the tool holder 16 and tool bit 18 radially outwardly or inwardly with respect to the axis of the boring bar 22. This is accomplished through the instrumentality of a bevel gear pinion 78 which is in meshing relationship with respect to the lead screw drive gear 68. Pinion 78 is pinned to a pinion shaft 80 which is freely rotatably mounted in a pinion bearing carrier 82 through the instrumentality of a pinion bearing 83. The pinion bearing carrier is fastened to body 12 of the boring head 10 through the instrumentality of cap screws 84. The pinion shaft 80 forms the drive shaft of the boring head.

The pinion shaft 80 is keyed as at 86 to an inner clutch face plate 88. An elongated threaded portion 89 of the pinion shaft 80 of reduced diameter extends outwardly past the inner clutch face plate 88 to freely rotatably support a friction clutch disc 90 and an outer safety clutch pressure face plate and driver 92. Face plate and driver 92 is provided with a radially outwardly extending, externally threaded, stud 94. A static bar 96 for the purpose of preventing rotation of the outer clutch face plate and driver 92 with respect to the work piece 30 is internally threaded to be fitted onto the externally threaded stud 94. When so fitted, the bar 96 becomes part of the boring head.

The clutch plates 88 and 92 and the friction clutch disc 90 are maintained on the outer end 89 of a pinion shaft 80 by a castellated nut 98. The positioning of the nut 98 along the elongated threaded portion 89 of the pinion shaft 80 determines the pressure existing between the faces of clutch plates 88 and 92 on the friction clutch disc 90; and so determines how much torque can be transmitted between the outer clutch plate and driver 92 and the bevel gear pinion 78 from inner clutch face plate 88, through key 86 and the pinion shaft 80.

The inner clutch face plate 88 is provided with a conical outwardly extending dial portion 100 which is inscribed with a plurality of equidistant scribe marks 102 around the entire periphery thereof. A scribe line 104 is shown in FIG. 1 as extending along a cylindrical outer face of the pinion bearing carrier 82 and of the boring head body 12. For the sake of clarity this scribe line is shown as lying in a horizontal plane with respect to the axis of rotation of the boring head, but in actual practice, the scribe line 104 could be at the top of the pinion bearing carrier and so would lie in a vertical plane with the axis of rotation of the boring head. The relationship of particular scribe marks 102 with respect to scribe line 104 is a measure of the positioning of the tool bit 18 out along the vertical face 50 of the work piece.

In operation, after the boring head, boring bar and boring machine are positioned so that the axis of rotation of the boring bar and boring head is concentric with the surface to be machined, the tool holder 16 will be retracted to move the tool bit radially inwardly to be in clearing relationship inside of the outer periphery of the circular opening 54 in the vertical work piece wall 48. With the parts positioned as seen in FIG. 1, for example, this can be done by removing the static drive bar 96 from the threaded stud 94 and by rotating the castellated nut in direction to cause the bevel gear pinion 78 to rotate the beveled lead screw drive gear 68 and lead screw nut 66 to draw the lead screw 64 into the nut this moving the tool holder 16 in radially inward direction.

With the tool bit 18 inwardly of the surface where the machining is to begin, the boring bar 22 and boring head 10 will be positioned with respect to the work piece 30 so that the tool bit will be aligned to make an initial cut of the desired depth. A static drive bar 96 will be reinstalled on the stud 94 extending radially outwardly from the outer clutch plate and driver 92. The drive bar will be of length to bear against a portion of the work piece or other base fixedly mounted with respect to the work piece to positively prevent rotation of the clutch plate and driver 92 with respect to the work piece.

The boring machine 24 will then be put into operation to cause the boring bar 22 to rotate, thus rotating the boring head 10 causing the tool bit 18 to move in a substantially circular path around the axis of the boring bar and boring head. Since the outer clutch plate and driver 92 cannot rotate, the friction between it, the friction clutch disc 90 and the inner clutch plate 88 will be such that the inner clutch plate will not rotate, thus maintaining the pinion shaft 80 and the bevel gear pinion 78 from rotation through the instrumentality of key 86. The beveled lead screw drive gear 68, being in meshing relationship with respect to the relatively stationary bevel gear pinion 78, must rotate around its longitudinal axis as it revolves in the boring head body 12 around the axis of the boring bar. This causes rotation of the lead screw nut 66 about its common axis with the drive gear 68. The lead screw 64 cannot rotate because it is fixedly mounted in the tool holder 16, and the tool holder is prevented from rotation by the tool bit 18 slidably mounted as it is between the parallel, spaced-apart, tool bit guide flats 60,60 in the tool slide 14. Therefore, rotation of the lead screw nut 66 causes the lead screw 64 to force the tool bit radially outwardly from the axis of rotation of the boring head as it is simultaneously carried around that boring head rotation axis.

The action is to continually and evenly and slowly advance the tool bit 18 in radial direction outwardly from the axis of the boring bar and boring head even as it swings in its circular path around that axis.

Should the load on the tool bit be too great in outward direction, the lead screw 64 will be prevented from moving into the lead screw 66, and this will bring that nut, beveled lead screw drive gear 68, meshing bevel gear pinion 78, and pinion shaft 80 to a halt. Rather than breaking the machinery, this overload will simply cause a slipping between the inner clutch face plate 88 and the outer safety clutch face plate and driver 92.

In this first mechanical form of the invention, when it is desired to machine a flat surface at right angles to the axis of the boring bar with the tool bit moving in inward direction, it is necessary only to rotate the boring bar in opposite direction and to position the static drive bar 96 to come into contact with a portion of the work piece to prevent rotation of the outer clutch plate and driver 92 in the new direction of rotation of the boring bar. This will cause the lead screw 64, the tool holder 16 and the tool bit 18 to move radially inwardly in the tool slide 14 in direction toward the center of rotation of the tool bar 22.

Whenever the lead screw 64 moves through the boring head to position the tool holder 16 in close adjacent relationship with respect to the axis of rotation of the boring head and boring bar, the lead screw will extend back through the lead screw nut 66 and out of the opposite end of the main body 12 of the boring head 10. In order to protect the lead screw when it is in this vulnerable position, a lead screw protection cover 108 is threadably mounted on an externally threaded outer end portion of the lead screw nut 66 to rotate with that nut about the axis of the nut and the lead screw 64 when the boring head is in active use.

The boring head of the invention was developed to allow precise and accurate machining of vertical faces which were not readily accessible from outside of the work pieces to be machined. However, the boring head of the invention can be readily converted to be operative on the vertical face of a work piece which is in facing relationship to the boring machine.

For example, if a vertical wall surface 110 of the vertical work piece wall 48 in facing relationship to the boring machine 24 was to be machined by the boring head 10, the boring head would be installed on the boring machine outside of the work piece 30 and to the right as seen in FIG. 1. The four cap screws 58 would be removed, the tool slide 14 rotated 180° from the position seen in FIG. 1, and the cap screws 58 reinstalled. This will position the tool bit 18 to extend outwardly from the tool slide in direction opposite to that shown in FIG. 1. With the parts so positioned, the machining of the vertical surface 110 could be accomplished as was the machining of the vertical surface 50 of the vertical work piece wall 48.

In order to use the boring head 10 for boring and grooving operations, the tool holder 16 can be replaced by a tool holder in which a tool bit such as the tool bit 18 is mounted in line with the longitudinal axis of the tool holder receiving surface 61 of the tool slide 14 to extend outwardly of the tool slide on a radius of the boring head rotation axis. A tool slide positioning block can extend radially out from the cylindrical portion of the tool holder to ride in guide slot 63 to prevent rotation of the tool bit; and set screws like set screws 62 threaded in this guide block can hold the tool bit in position in the tool holder.

SECOND FORM

A boring head 210 of a second, hydraulically fed, form of the invention includes a main body 212, a tool slide 214 bolted to the main body by 4 cap screws 258, a tool holder 216 slidably mounted in the tool slide, a tool bit 218 mounted in the tool holder, and a taper shank 220 bolted as in 221 to the main body. This taper shank 220 can be attached in any usual or preferred manner to a boring bar 222 which is rotatably driven in a boring machine 224. The relationship of the boring machine, the boring bar, the vertical and horizontal ways, the table and the platform to a work piece to be machined can be identical to that shown in connection with the first form of the invention, and most of these elements are not repeated here.

Tool slide 214 is provided with a cylindrical tool holder receiving surface 261 in which the cylindrical body of the tool holder 216 is slidably received. The interior of the main body 212 of the boring head defines a slave cylinder 227. This cylinder is an extension of the cylindrical surface 261 in the tool slide 214, and a tool holder driver piston 229 is slidably mounted in cylinder 227. This drive piston is integrally connected to the tool holder 214 as at 231.

A master cylinder casing 232 extends outwardly from the body 212 and defines a master cylinder 233 which has its longitudinal axis on the longitudinal axis of rotation of the taper shank 220 and the boring bar 222. A master piston 235 is slidably mounted in the master cylinder. An hydraulic passageway 237 is provided in the body 212 and is open from the open end of master cylinder 233 to the rod end of the slave cylinder 227. The open end of master cylinder 233, the rod end of slave cylinder 227 and the hydraulic passageway 237 are filled with hydraulic fluid 238.

A slave piston return rod 239 extends outwardly of the main body 212 of the boring head 210 through suitable glands in a slave cylinder end cap 241 which is fastened in sealing relationship to an end of the body 212 by cap screws 243. A return piston rod end nut 245 and a spring retaining washer 247 on slave piston return rod 239, together with the outside surface of the end cap 241 receive outward pressures from a compression coil spring 249 which surrounds the slave piston return rod 239 to normally urge the slave cylinder 227 and consequently the tool holder 216 and tool bit 218 to move radially inwardly toward the axis of rotation of the boring head 210.

As in the case with the first form of the invention, the tool bit 218 is prevented from rotation on the longitudinal axis of the tool holder 216 by the presence of parallel, spaced-apart, tool bit guide flats 260,260, defining a tool bit guide slot 263 in the tool slide 214.

In this second form of the invention, a feed screw 265 serves as a piston rod for the master piston 235, and is driven forward by a feed screw nut and gear 266 which is rotatably mounted in the outer end of the master cylinder casing 232. The friction between the piston 235 and the cylinder 233 normally prevents rotation of the feed screw 265 with respect to the boring head body. As the feed screw 265 is advanced, it advances the master piston 235 to the right as seen in FIG. 7, thus forcing more hydraulic fluid into the slave cylinder 227 to cause the tool holder drive piston 229 to force the tool holder 216 and the tool bit 218 upwardly as seen in that figure. This causes the tool bit to move very slowly outwardly all during the time that the boring head is rotating to make the desired facing cut.

The mechanism which causes the feed screw nut and gear 266 to rotate with respect to the feed screw 265 includes a master cylinder casing flange 251 integral with and extending radially outwardly from the master cylinder casing 232; a reducing gear shaft 252 extending outwardly from the flange 251; a compound reducing gear 253 having a pinion portion in meshing driving relationship with respect to the gear teeth of the feed screw nut and gear 266 and a gear portion of greater diameter in meshing relationship to a drive pinion 255 which is positioned in freely rotatable relationship around the feed screw 265. This drive pinion 255 is provided with an integral hexagonal shaped nut-like driver 257.

As in the case with the first form of the invention, by utilizing a wrench-like static drive bar 298 in operational gripping contact with the nut-like driver 257, and by restraining the drive bar from rotation, as by letting it come into contact with the work piece or otherwise, the drive pinion 255 (with which the driver 257 is integral) cannot rotate as the boring head 10 rotates about its axis and the axis of the boring bar. This forces rotation of the reducing gear 253 and ultimately the feed screw gear and nut 266. The rotation of this feed screw nut and gear forces the master piston 235 to the right as seen in FIG. 7, thus utilizing the hydraulic fluid to cause the tool bit 218 to move radially outwardly in the manner previously described.

When the machining of the vertical work piece face has been completed and the tool bit 218 moved into clearing relationship with respect to the work piece (not shown), the tool bit and tool holder can be moved radially inwardly to prepare for the next cut. This can be done by applying a wrench or an electric drill to one of a pair of locking nuts 269,269 locked to each other on the outer end of the feed screw 266 to overcome the friction between the piston 235 and cylinder 233. This can also be done by rotating the driver 257. This moves feed screw 265 longitudinally to cause the master piston 235 to reduce the hydraulic pressure within the system and so allow the compression coil spring 249 to move slave piston return rod 239, tool holder drive piston 229 and consequently the tool bit 218 inwardly until the tool bit is positioned at or inside of the inner periphery of the surface to be machined.

The work piece and the tool bit will then be related to each other so that a cut of the desired depth will be made, and the boring head will once again be rotated to cause the tool bit to revolve around the work piece at the same time moving evenly out radially along the axis of the tool holder 216.

A removable guard 269 is provided to cover the gearing during operation of the boring head.

Should the tool bit 218 or tool holder 216 hit an obstruction which prevents outward movement with respect to the tool slide, the hydraulic pressure will build up in the system and will prevent forward motion of the master piston 235. At this point, the friction between the master piston and the master cylinder will be overcome and the feed screw nut 266 will begin to rotate with the feed screw nut 265, thus preventing damage to the parts.

While cap screws 58,58 and 258,258 are shown as protruding above the top of the tool slides 14 and 214, respectively, it is to be understood that they could be recessed or countersunk to lie inside of their tool slides. Also the tool slides 14 and 214 themselves could have rounded cylindrical end surfaces on a radius of the axis of rotation of the boring head. This will allow the facing operations to be carried out substantially the maximum radial dimension of the tool slide.

The embodiments of the invention in which an exclusive property or privilege is claimed are defined as follows:

1. A boring head for use with a machine-driven rotatable boring bar to machine a surface of a work piece concentric with and extending at right angles to the axis of rotation of the boring bar, said boring head including:
   A. a main body;
   B. means to attach the main body to the boring bar to establish an axis of boring head rotation coincident with the axis of boring bar rotation;
   C. a tool slide extending longitudinally outwardly from the main body of the boring head radially of the axis of boring head rotation;
   D. a tool holder slidably mounted in the tool slide for movement radially of the axis of boring head rotation.
   E. a tool bit in the tool holder extending outwardly from the tool slide in direction toward a surface to be machined;
   F. means to prevent rotation of the tool bit with respect to the longitudinal axis of the tool slide;
   G. means responsive to rotation of the boring head on its axis of rotation to move said tool bit longitudinally of said tool slide at a rate proportional to the rate of movement of said boring head around said axis of rotation;
   H. said tool slide being provided with a longitudinally extending guide slot defined by parallel, spaced-apart guide flats; and
   I. said tool bit extending from the tool holder through said guide slot and being guided and supported by at least one of said tool slide guide flats as it moves longitudinally of the tool slide responsive to rotation of said boring head around the axis of boring head rotation.

2. The boring head of claim 1 wherein:
   J. said tool bit extends outwardly from said tool holder in direction toward said means to attach said main body to said boring head.

3. The boring head of claim 1 wherein said means to move said tool bit longitudinally of said tool slide includes:
   J. a threaded lead screw fastened to the tool holder and extending longitudinally of said tool slide through a provided opening in said main body;
   K. a drive shaft rotatably mounted with respect to said boring head body on the axis of boring head rotation and at a side of said main boring head body opposite said means to attach said main body to said boring bar;
   L. a lead screw nut threadably associated with said lead screw and rotatably mounted with respect to said boring head body;
   M. gear means in said body interconnecting said drive shaft and said lead screw nut to cause said lead screw nut to rotate with respect to said boring head body and said lead screw responsive to rotation of said drive shaft with respect to said boring head body; and
   N. means to prevent rotation of said drive shaft with respect to said work piece.

4. The boring head of claim 3 wherein the means to prevent rotation of the drive shaft includes:
   O. a first clutch plate fixedly and concentrically mounted on an outer end portion of the drive shaft;
   P. a second clutch plate concentrically and freely rotatably mounted on said drive shaft to be in facing relation to said first clutch plate;
   Q. means to establish a predetermined resistance to mutual movement of one clutch plate with respect to the other such that said clutch plates remained locked to each other under normal load conditions but will turn with respect to each other under overload conditions; and
   R. a static drive bar effectively connected to said second clutch plate to prevent rotation of said second clutch plate with respect to said work piece.

5. The boring head of claim 1 wherein said means to move said tool bit longitudinally of said tool slide includes:
   J. a threaded lead screw fastened to the tool holder and extending longitudinally of said tool slide through a provided opening in said main body;
   K. a drive shaft rotatably mounted with respect to said boring head body on the axis of boring head rotation and at a side of said boring head body opposite said boring bar;
   L. a lead screw nut threadably associated with said lead screw and rotatably mounted with respect to said boring head body;
   M. gear means in said body interconnecting said drive shaft and said lead screw nut to cause said lead screw nut to rotate with respect to said boring head body and said lead screw responsive to rotation of said drive shaft with respect to said boring head body; and
   N. means to prevent rotation of said drive shaft with respect to said work piece.

6. The boring head of claim 5 wherein the means to prevent rotation of the drive shaft includes:
   O. a first clutch plate fixedly and concentrically mounted on an outer end portion of the drive shaft;
   P. a second clutch plate concentrically and freely rotatably mounted on said drive shaft to be in facing relation to said first clutch plate;
   Q. means to establish a predetermined resistance to mutual movement of one clutch plate with respect to the other such that said clutch plates remained locked to each other under normal load conditions but will turn with respect to each other under overload conditions; and
   R. a static drive bar effectively connected to said second clutch plate to prevent rotation of said second clutch plate with respect to said work piece.

7. The boring head of claim 1 wherein said means to move said tool bit longitudinally of said tool slide includes:
   J. a slave cylinder provided in said boring head body in longitudinal alignment with said tool slide;

K. a slave tool holder drive piston in said slave cylinder;

L. means operative between said holder drive piston and said tool holder to cause said tool holder to move in said tool slide responsive to movement of said holder drive piston in said slave cylinder;

M. a master cylinder casing providing a master cylinder having a longitudinal axis in alignment with said axis of boring head rotation at a side of said body opposite said boring bar;

N. a master piston in said master cylinder;

O. a fluid passageway between a first end of said master cylinder and an end of said slave cylinder opposite said tool holder; and P. means to cause said master piston to move toward the first end of said master cylinder responsive to the rotation of the boring head on its axis of rotation.

8. The boring head of claim 7 wherein the means to cause said master piston to move in the master cylinder includes:

Q. a threaded feed screw fastened to said master piston and extending away from said first end of said master cylinder to have its longitudinal axis on the boring head rotation axis;

R. means to normally prevent said feed screw from rotating with respect to said boring head body;

S. a threaded feed screw nut threadably associated with said feed screw and rotatably mounted in an outer end of said master cylinder casing;

T. a driver freely rotatably mounted on and around said feed screw;

U. gear means connecting said driver and said feed screw nut to cause said feed screw nut to turn relative to said boring head body and said feed screw responsive to relative rotation of said driver with respect to said body; and V. means to prevent rotation of said driver with respect to said work piece.

9. The boring head of claim 8 and means to move said tool holder longitudinally of said tool slide in direction toward the axis of boring head rotation, said means including:

W. means to rotate said feed screw and said feed screw nut relative to each other in direction to cause said master piston to move in direction away from the first end of said master cylinder;

X. a slave piston return rod connected to said slave piston and extending through said slave cylinder to outside of said boring head body; and Y. bias means operative on said return rod to tend to urge said rod in direction to move said tool holder slave piston in direction away from said tool holder.

10. The boring head of claim 1, 3, 5 or 7 wherein said tool bit extends outwardly from said tool holder in direction toward said means to attach said main body to said boring bar.

11. The boring head of claim 1, 2, 5 or 7 wherein said tool bit extends outwardly from said tool holder in direction away from said means to attach said main body to the boring bar.

* * * * *